United States Patent Office 3,535,847
Patented Oct. 27, 1970

3,535,847
APPARATUS FOR STACKING AND PACKING CYLINDRICAL OR ROD-SHAPED WORKPIECES
Harald Strohmeier and Gottlieb Pernkopf, Kapfenberg, Austria, assignors to Gebr. Bohler & Co. Aktiengesellschaft, Vienna, Austria
Filed Dec. 6, 1967, Ser. No. 688,438
Claims priority, application Austria, Dec. 7, 1966,
A 11,270/66
Int. Cl. B65b 57/20
U.S. Cl. 53—59                                          8 Claims

ABSTRACT OF THE DISCLOSURE

Apparatus for stacking and packing welding electrodes wherein the electrodes arriving in rapid succession are marked with suitable indicia, counted and the requisite number deposited into collecting bins. Two collecting bins are arranged side by side below the counter and a chain conveyor moves step by step beneath the bins with two successive steps being of different length. Compartments for receiving the electrodes are carried by the chain and arranged so that after each step of the chain only one compartment is loaded and the unloading of the electrodes from two compartments into cartons is effected after every other step.

---

Figure 1:
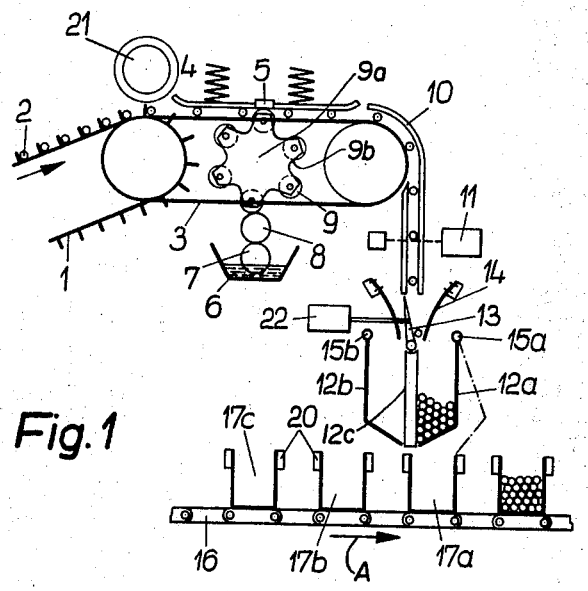

The present invention relates to an apparatus for stacking and packing substantially cylindrical or rod-shaped workpieces of the same type, and particularly welding electrodes including two electrode collecting bins arranged in side by side relationship and a compartment adapted to be located under each of the two bins carried by a chain conveyor capable of step by step movement.

The welding rods which arrive in rapid succession on a conveyor belt from a drying oven are moved past a stamping unit for having imprinted thereon a model, firm designation, or other indicia, after which the rods leaving the stamping unit are stacked by hand, counted and packed into a carton of the type generally opened at one of the ends thereof.

In order to effect this packing operation mechanically and automatically an apparatus had to be designed in which the rods emanating from the stamping unit on a conveyor belt are counted and stacked in the number required for the particular packing unit, with such rods later being introduced or pushed into a packing carton. It was necessary in order to accomplish the desired ends to proceed from the arrangement of stacking bins wherein the bins are located some distance from each other to provide sufficient space between the bins for the closure flaps which project on all sides of the end of the carton. This particular arrangement of the stacking bins which are operably related to the preceding conveying components required a particular arrangement for the packing operation.

The welding rods which arrive in rapid succession from the drying oven are moved at the same speed to a marking unit for marking the rods and subsequently to a counter unit. Until the particular number of rods set in the counting unit is reached, the rods fall into one of two bins arranged closely together. Due to the closeness of the two collecting bins, in contrast to the position of the compartments provided on a chain conveyor movable therebeneath and into which compartments the rods are introduced, the chain must travel paths of different length in two successive steps. In order not to interrupt the continuous introduction of the rods it is essential to make the period of chain standstill or cessation plus the particular chain step the same. Consequently, the period of chain standstill following the short step is greater than the period of the step following the longer step since the travel of the longer path requires more time. The longer standstill of the chain can be utilized efficaciously for the ejection or unloading of the rods from the compartment on the chain due to the fact that the movement back and forth of the ejecting means requires more time.

According to the invention, two successive steps of the chain conveyor are of different length, and preferably the ratio of the steps is 1:3.

Figure 2:
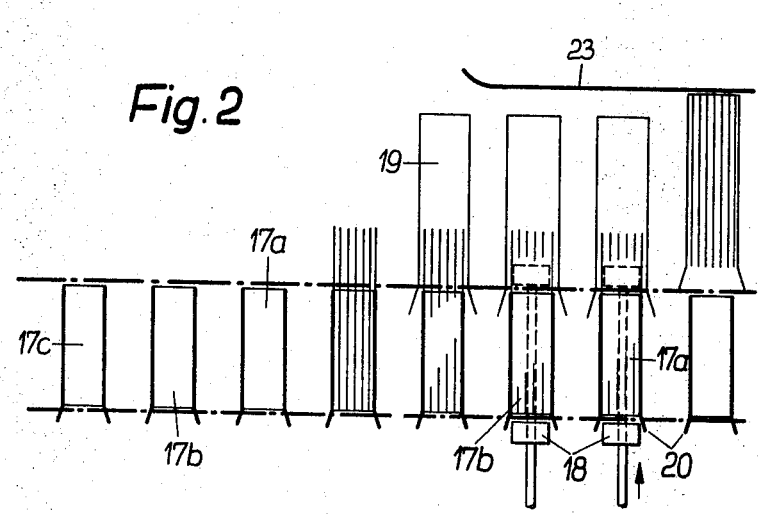

Further objects and advantages of the invention will become more readily apparent from the following detailed description and annexed drawings, and in which drawings:

FIG. 1 is a fragmentary view partly in elevation and partly in cross-section of an apparatus embodying the present invention, and FIG. 2 is a fragmentary plan view of a chain conveyor provided for the machine.

In FIG. 1 it will be noted that cylindrical or rod-shaped workpieces, and more particularly welding rods, 2 carried by a conveyor belt 1 which communicates with a drying oven (not shown) are deposited on a conveyor belt 3 and to prevent an upward movement or "bouncing'" of the rods at the point of transfer from the belt 1 to the belt 3, a roller 21 provided with a foam rubber shell or covering is located above the transfer point. A printing plate 4 which carries a printing block 5 is positioned above the upper flight of the conveyor 3 and a reservoir 6 for stamping ink is suitably positioned below the lower flight of the belt 3. An inking roller 7 dips into the ink in the reservoir and transfers the ink to a transfer roller 8 in peripheral contact therewith. Mounted above the reservoir 6 is a rotatable member 9a having a plurality of spaced-apart arms 9b and each arm supports a roller 9 adapted to contact the transfer roller 8 so that the ink can be applied to the printing block 5 when a roller 9 makes contact therewith, as shown in FIG. 1. The spacing of the arms 9b is such that the roller 9 makes contact with the block 5 after one rod has passed the block and before the following rod passes the block.

A guide channel 10 is located adjacent the exit end of the conveyor belt 3 and the rods 2 are adapted to fall downwardly through the guide channel 10 at a great speed due to the kinetic energy inherent in the rods. A counting unit 11 is arranged laterally of the guide channel 10 for counting the rods falling through the channel and when a predetermined number of rods has been reached, the counting unit releases a switching mechanism 22 which actuates a pivotally mounted flap 13 for regulating the supply of the welding rods to different stacking bins.

It will be noted that two bins 12a and 12b arranged in side by side relationship are located beneath the guide channel 10 and separating wall 12c of the bins lies axially below the guide channel 10. The flap 13 is fastened above the separating wall 12c and, as shown in FIG. 1, the flap serves to guide the rods 2 according to the number determined by the counting unit into one of the two bins and more particularly the bin 12a, as illustrated in the drawing. It will further be noted that elastic dampers 14 project into the path of downward movement of the rods 2 above the bins for checking the speed of fall of the rods, thereby preventing a "bouncing" of the rods from the bin. The outer walls of the bins 12a and 12b are pivotable about axes 15a and 15b, respectively, and are, when the bins are filled with the number of rods set by the counting unit, movable from the full line position shown in FIG. 1 to the dot-dash line position to enable the rods to fall into a compartment positioned therebeneath.

More specifically, it will be seen that chain conveyor 16 is movable below the bins 12a and 12b and the chain conveyor is provided with a plurality of compartments 17a, 17b, 17c, etc. It should be noted that only every other link of the chain conveyor carries a compartment. By virtue of this particular arrangement of the compartments only one of the compartments 17a, 17b, 17c, etc. on the chain 16 can be positioned under the two bins 12a and 12b. As illustrated in FIG. 1, only the compartment 17a is in position for loading from the bin 12a.

Following the unloading of the bin 12a and the loading of the compartment 17a with the welding rods 2, the chain is moved in the direction of arrow A by one link so that the compartment 17b is disposed below the bin 12b. The rods 2 which have been deposited in the bin 12b can now be deposited into the compartment 17b. Following the loading of the compartment 17b the conveyor chain must move in the direction of the arrow A a distance of three links in order that the compartment 17c which is to be loaded with rods is moved to a position below the bin 12a.

Referring to FIG. 2, it will be seen that the rods 2 in the compartments 17a, b, c, etc. protrude at one end over the links in order that a carton 19 open at one end can be partly slipped over the ends of the rods 2. On the opposite side of the conveyor chain 16 at a distance from the rod loading arrangement two pistons 18 are provided, which pistons, after the shorter of the two conveying steps of the chain, simultaneously push the rods located in the compartments (17a, 17b) into the cartons 19 positioned at the other end. The ejection or displacement of the rods 2 from the compartments occurs following the shorter step since the standstill of the chain conveyor 16 after this step is longer than following the longer step.

In order to displace or push all of the rods 2 simultaneously and without damaging the same the pistons 18 must very accurately match the cross-section of the compartments 17a, b, c, etc. However, as the links have play therebetween it is advisable to provide a piston guide with lateral springs so that the piston can adapt itself to the altered position of the compartments Furthermore, it is advantageous to equip the piston end side of the compartments 17 with oblique guide surfaces 20 whereby the pistons 18 can be introduced easily into the compartments 17a, b, c, etc.

Briefly, the operation of the machine is as follows:

The rods 2 on the belt 1 are transferred to the belt 3 and the roller 21 prevents a "bouncing" of the rods at the transfer point and the belt 3 moves the rods 2 below the printing plate 4 and the rods are forced to roll counter to the general conveying movement so that while traversing the distance covered by the plate 4 each rod is moved towards the exit end of the belt at half speed. On rolling past the printing block 5 which has been inked by one of the rollers 9, each rod is imprinted with the desired marking. Subsequently, the rods fall downwardly through the guide channel 10 and during passage therethrough into the bin 12a, the rods are counted by the counting unit 11. When the set number of rods has been reached, the counting unit 11 releases the switching mechanism 22 which moves the flap 13 from the position illustrated to provide a path from the guide channel 10 into the bin 12b so that the following rods 2 are deposited in the bin 12b. With this displacement or movement of the flap 13, the outer wall of the bin 12a is swung about its axis 15a to the position shown by the dot-dash lines, whereupon the rods 2 in the bin 12a fall into the compartment 17a.

After the compartment 17a has been loaded, the chain conveyor is moved in the direction of the arrow A one step and following the unloading of the bin 12b into the compartment 17b the chain is moved in the same direction three steps. With this alternation of steps one and three the compartments 17a and 17b arrive at the position illustrated in FIG. 2 and the pistons 18 force the rods in the respective compartments into the packing cartons 19. It should be mentioned that the cartons 19 are slipped onto the rods before the ejector position is reached so that the cartons travel with the chain conveyor to the ejector position. The free or opposite ends of the cartons engage a rail 23 which holds the cartons in position during the inward movement of the rods 2.

By the division of the operations herein disclosed, the rhythm set by the continuous succession of the rods 2 advancing or coming from the oven can be maintained without any delay and the desired high conveying and packing output can be accomplished.

This invention is not to be confined to any strict conformity to the showings in the drawings but changes or modifications may be made therein so long as such changes or modifications mark no material departure from the spirit and scope of the appended claims.

We claim:

1. Apparatus for continuously grouping and packaging a predetermined number of rod-like workpieces of the same type in containers, which apparatus comprises:

(a) a conveying means for successively moving the workpieces to a point where they fall by gravity;

(b) two collecting bins to selectively receive the falling workpieces;

(c) a counting mechanism for counting the falling workpieces before they reach said bins;

(d) a switching mechanism, actuated by said counting mechanism after the predetermined number of workpieces has been counted, for deflecting the workpieces from one of said bins to the other;

(e) a second conveying means having open topped compartments spaced therealong, said second conveying means intermittently moving one of said compartments alternately under said two collecting bins so that the predetermined number of workpieces in each said bin is transferred to each said compartment; and (f) ejecting means for ejecting the predetermined workpieces from said compartments into the containers.

2. Apparatus as claimed in claim 1 wherein the predetermined number of workpieces in said one bin is transferred to one of said compartments by gravity while said other bin is being filled; and said ejecting means is spaced from said bins downstream relative said second conveying means direction of travel, the ejecting occurring during the standstill period of said second conveying means.

3. Apparatus as claimed in claim 2 wherein the successive intermittent movements by said second conveying means are alternately relatively of short and long length; said ejecting means comprises at least two pistons and said open topped compartments also has open ends; the ejecting by said pistons occurs after the conveying means movement of short length.

4. Apparatus as claimed in claim 3 wherein said compartments are shorter than the workpieces they carry and the container is slid over the ends of the workpieces protruding beyond said compartment before said pistons eject the workpieces from said compartments, and a stop means spaced from said compartments in the direction of said piston movement to hold the containers so the workpieces can be inserted therein.

5. Apparatus as claimed in claim 1 and further comprising a guide channel through which the workpieces fall between said point on said conveying means and said switching mechanism.

6. Apparatus as claimed in claim 1 and further comprising an elastic damping means located above said bins for reducing the speed of the falling workpieces; and oblique surfaces on one end of said compartments for guiding said ejecting means therein.

7. Apparatus as claimed in claim 1 and further comprising printing means in conjunction with said conveying means for placing suitable indicia on the workpieces.

8. Apparatus as claimed in claim 3 wherein the ratio between said short and long length is 1:3.

References Cited

UNITED STATES PATENTS

| | | | |
|---|---|---|---|
| 2,523,517 | 9/1950 | Potter | 53—168 X |
| 2,551,080 | 5/1951 | Allen et al. | 141—167 X |
| 2,770,351 | 11/1956 | Curioni | 198—44 X |
| 3,119,217 | 1/1964 | Brownlee | 53—236 |

TRAVIS S. McGEHEE, Primary Examiner

R. L. SPRUILL, Assistant Examiner

U.S. Cl. X.R.

53—78, 131, 236, 248; 198—44